(12) United States Patent
Wragge

(10) Patent No.: US 7,174,535 B2
(45) Date of Patent: Feb. 6, 2007

(54) BUILD AND INSTALL FOR SOFTWARE APPLICATIONS

(75) Inventor: Frank Wragge, Mountain View, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 356 days.

(21) Appl. No.: 10/382,775

(22) Filed: Mar. 5, 2003

(65) Prior Publication Data

US 2004/0177355 A1  Sep. 9, 2004

(51) Int. Cl.
*G06F 9/44* (2006.01)

(52) U.S. Cl. ........................ 717/107; 717/121; 717/177

(58) Field of Classification Search ........ 717/168–178, 717/101–123
See application file for complete search history.

(56) References Cited

U.S. PATENT DOCUMENTS

| | | | |
|---|---|---|---|
| 4,558,413 A | 12/1985 | Schmidt et al. | |
| 6,487,583 B1 | 11/2002 | Harvey et al. | |
| 6,490,723 B1 | 12/2002 | Bearden et al. | |
| 6,493,693 B1 | 12/2002 | Hill | |
| 6,513,045 B1 | 1/2003 | Casey et al. | |
| 6,520,410 B2 | 2/2003 | Putman et al. | |
| 6,523,035 B1 | 2/2003 | Fleming et al. | |
| 6,742,015 B1 * | 5/2004 | Bowman-Amuah | ......... 718/101 |
| 2003/0028867 A1 | 2/2003 | Kryloff et al. | |

FOREIGN PATENT DOCUMENTS

WO   WO 98/27487 A1   6/1998

OTHER PUBLICATIONS

Parrish et al., "A Conceptual Foundation for Component-Based Software Development", University of Alabama, Dept. of Computer Science, pp. 1-18, Jun. 2000.*
Green, "Component-based Software Development Implications for Documentation", ACM, pp. 159-164, 1999.*
Bailey E C: "Maximum RPM—Taking the Red hat Package Manager to the Limit" Redhat Documentation License, Feb. 17, 1997, XP002289333, pp. 1-467.
Jackson I et al: "Debian Packaging Manual, version 3.2.1.0", Aug. 24, 2000; XP002289346; pp. 1-69.

* cited by examiner

*Primary Examiner*—Ted T. Vo

(57) ABSTRACT

Techniques for developing software applications are provided. In general, information is gathered throughout the software development process and that information is utilized to more efficiently build and install software applications. Application components can be defined at an early stage in the software application development. When the deliverable files are available or identified, the deliverable files can be mapped to the appropriate application component. Instructions for installing one or more builds of the software application can be generated utilizing this mapping and other information.

25 Claims, 6 Drawing Sheets

BUILD AND INSTALL FOR SOFTWARE APPLICATIONS

BACKGROUND OF THE INVENTION

The present invention relates to developing software applications. More specifically, the invention relates to techniques for building and installing software applications.

When computers were in their infancy, it was very common for a single programmer to develop a software application or program. Today, however, software applications are typically orders of magnitude more complex and are programmed by many programmers. Each programmer usually has one or more portion of the software application for which he or she is responsible.

As the number of programmers working on a software application increased, there grew a need to control modifications to the source code. As a result, source code control programs evolved that helped manage how the multiple programmers gain access to the source code. As an example, typically programmers "check out" source code modules and modifications that are made to the source code are recorded in some fashion.

Additionally, software applications typically have a large number of deliverable files (e.g., executables, dynamic link libraries, text files, and the like). In order to assist the installation process, installer programs are available that install the software application and its deliverable files on a computer system. For example, the install program can create directories and copy the deliverable files to their appropriate destination.

Although source code control programs and install programs have made software application development easier, it would be beneficial to have techniques that aid in the building and installation processes during software application development. For example, software application development has many stages in which source code control programs are typically utilized later in development during the low level design stage (e.g., programming) and installer programs are typically utilized at a still later stage in development. Accordingly, it would be beneficial to have improved techniques for building and installing software applications that utilize information gathered throughout the development process.

SUMMARY OF THE INVENTION

The present invention provides innovative techniques for building and installing software applications. In general, application components are defined at an early stage in software application development. Additionally, information about installation can also be defined at an early stage. After deliverable files are generated, the deliverable files can be mapped to the application components and instructions for installing the software application can be generated. Accordingly, software application development can be more efficient because build and installation are utilized through more of the software application development process. Some embodiments of the invention are described below.

In one embodiment, the invention provides a method of developing a software application. A plurality of application components for the software application are defined. A plurality of deliverable files for the software application are generated. One or more deliverable files is mapped to each application component. Instructions to install the software application are then generated. In one embodiment, a plurality of builds for the software application are defined where each build comprises one or more application components.

In another embodiment, the invention provides a method of developing a software application. A plurality of application components for the software application are defined. A plurality of builds for the software application are defined where each build comprises one or more application components. A plurality of deliverable files for the software application is generated. One or more deliverable files is mapped to each application component. Instructions to install the software application are then generated.

Other features and advantages of the invention will become readily apparent upon the review of the following description in association with the accompanying drawings. In the drawings, the same or similar structures will be identified by the same reference numerals.

DETAILED DESCRIPTION OF EMBODIMENTS

In the description that follows, the present invention will be described in reference to embodiments that assist in developing software applications. However, the invention is not limited to the specific implementations, applications or architectures described herein as the invention can be implemented in different ways. Therefore the description of the embodiments that follows is for purposes of illustration and not limitation.

Figure 1:
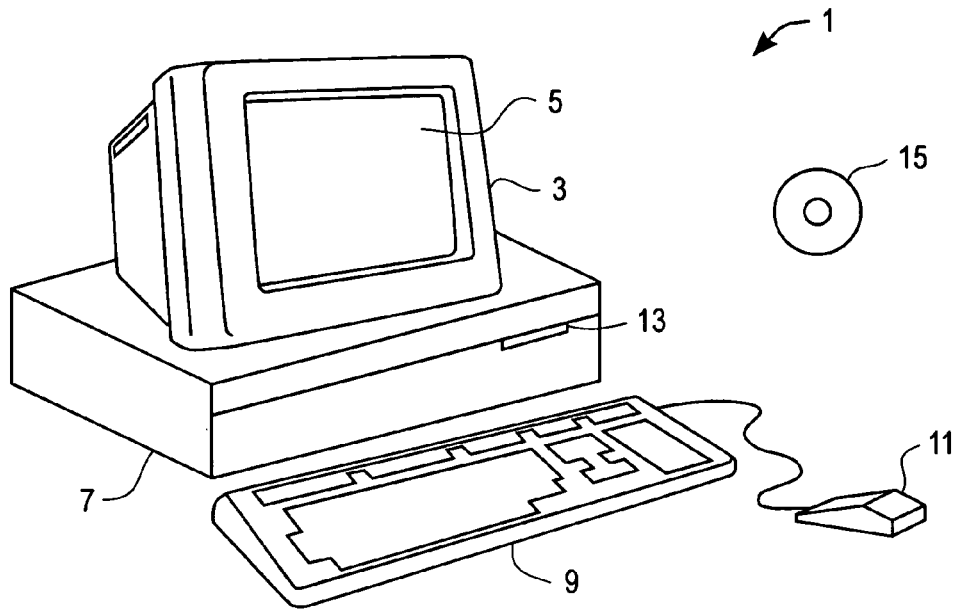
FIG. 1 illustrates and example of a computer system that can be utilized to execute software embodiments of the invention.

Software applications are installed and execute on computer systems. FIG. 1 illustrates an example of a computer system that can be used in association with embodiments of the invention. FIG. 1 shows computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2), which can be utilized to store and retrieve software programs incorporating computer codes that implement the invention, data for use with the invention, and the like. Although CD-ROM 15 is shown as an exemplary computer readable storage medium, other computer readable storage media including floppy disk, tape, flash memory, system memory, and hard drives can be utilized. Additionally, a data signal embodied in a carrier wave (e.g., in a network including the Internet) can be the computer readable storage medium.

Figure 2:
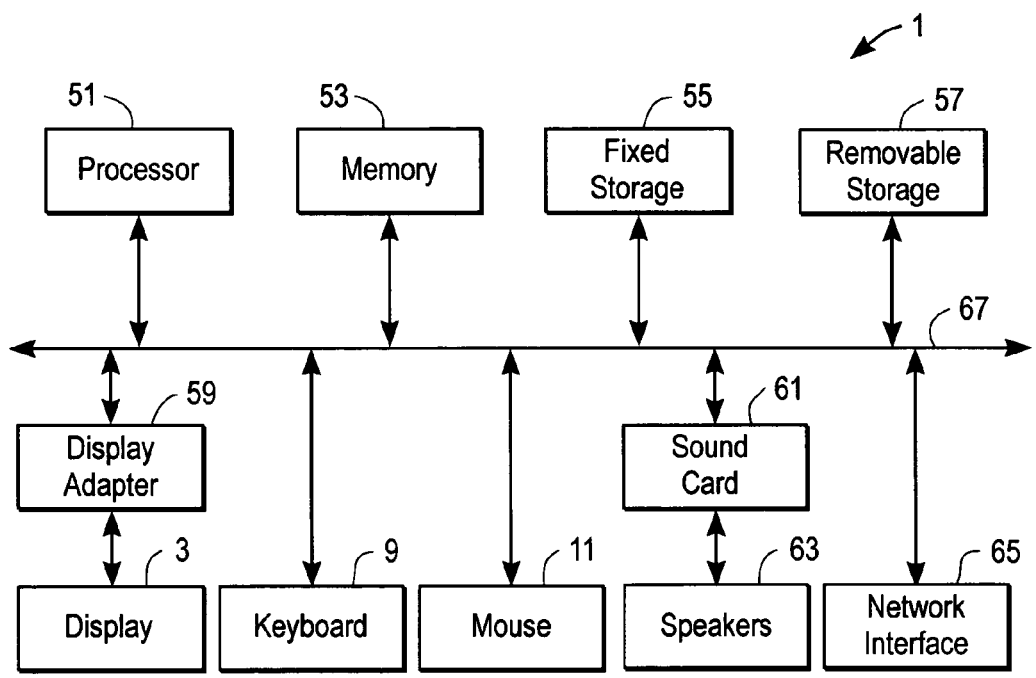
FIG. 2 illustrates a system block diagram of the computer system of FIG. 1.

FIG. 2 shows a system block diagram of computer system 1. As in FIG. 1, computer system 1 includes display 3, keyboard 9 and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any connection scheme serving to link the subsystems. For example, a local bus could be utilized to connect processor 51 to memory 53 and display adapter 59. Computer system 1 shown in FIG. 2 is but an example of a computer system suitable for use with the invention. Other computer architectures having different configurations of subsystems can also be utilized.

In a typical software development process, management specifies high level details about the desired software application. Management generally does not possess a high level of technical expertise, so the high level design is then given to software engineers to implement.

The engineers perform low level design which is then programmed into source code. Source control programs are typically utilized late in the software application development process during programming. As discussed above, install programs are also typically utilized very late in software application development.

Figure 3:
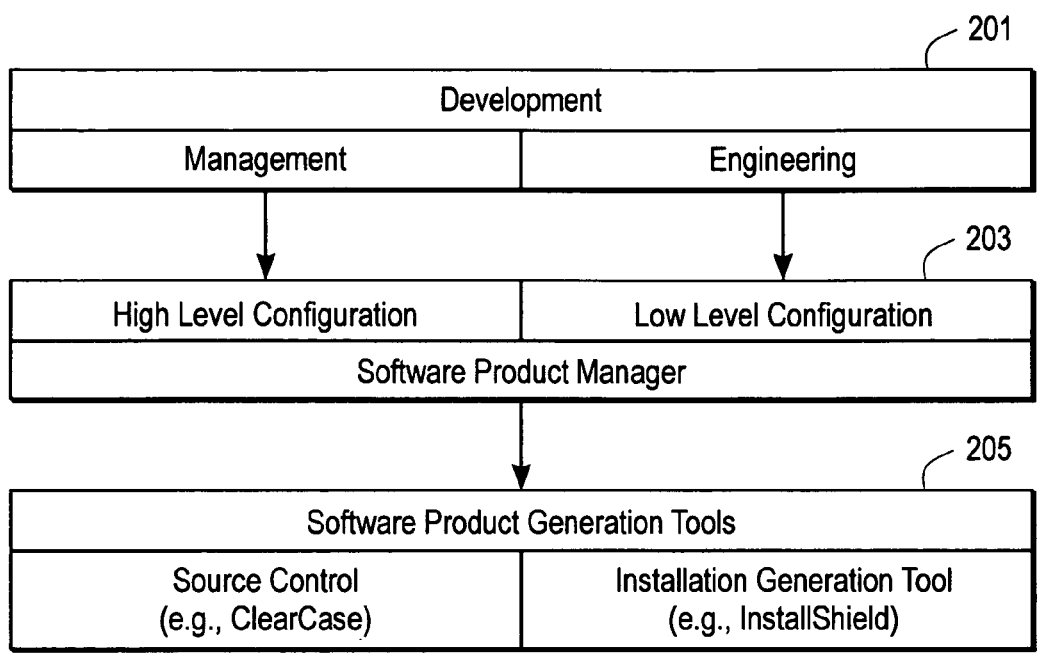
FIG. 3 shows an embodiment of the invention that is an interface between software application development and the build/installation.

With an embodiment of the invention, information from management and engineering during the entire software development process can be utilized to make the building and installation of the software application more efficient. FIG. 3 shows an embodiment of the invention that is an interface between development and build/installation.

As discussed above, development 201 is performed both by management and engineering. Initially, management performs high level configuration of the software application and engineering subsequently develops the low level configuration. A software product manager 203 is a software application implementing an embodiment of the invention that receives the high level configuration from management and the low level configuration from engineering. The information software product manager 203 receives can be received at various times during the software application development process.

Software product manager 203 can utilize the high level configuration and low level configuration to direct the development of the software application. For example, management typically understands the software application as a whole but not the inner workings of each individual component. Nevertheless, it allows management to perform high level configuration of source control and installation, such as defining application components, different builds, media for installation of the software application, and the like.

Individual engineers may understand the individual components but not the system as a whole. Software product manager 203 allows the engineers to define deliverable files for application components and generally implement the high level configuration specified by management.

Software product manager 203 can interface with software product generation tools 205 as shown, such as source control and installation programs. Although the software product manager has been described as interfacing with these two specific tools, other software product generation tools can be utilized or implemented in the software product manager itself.

Figure 4:
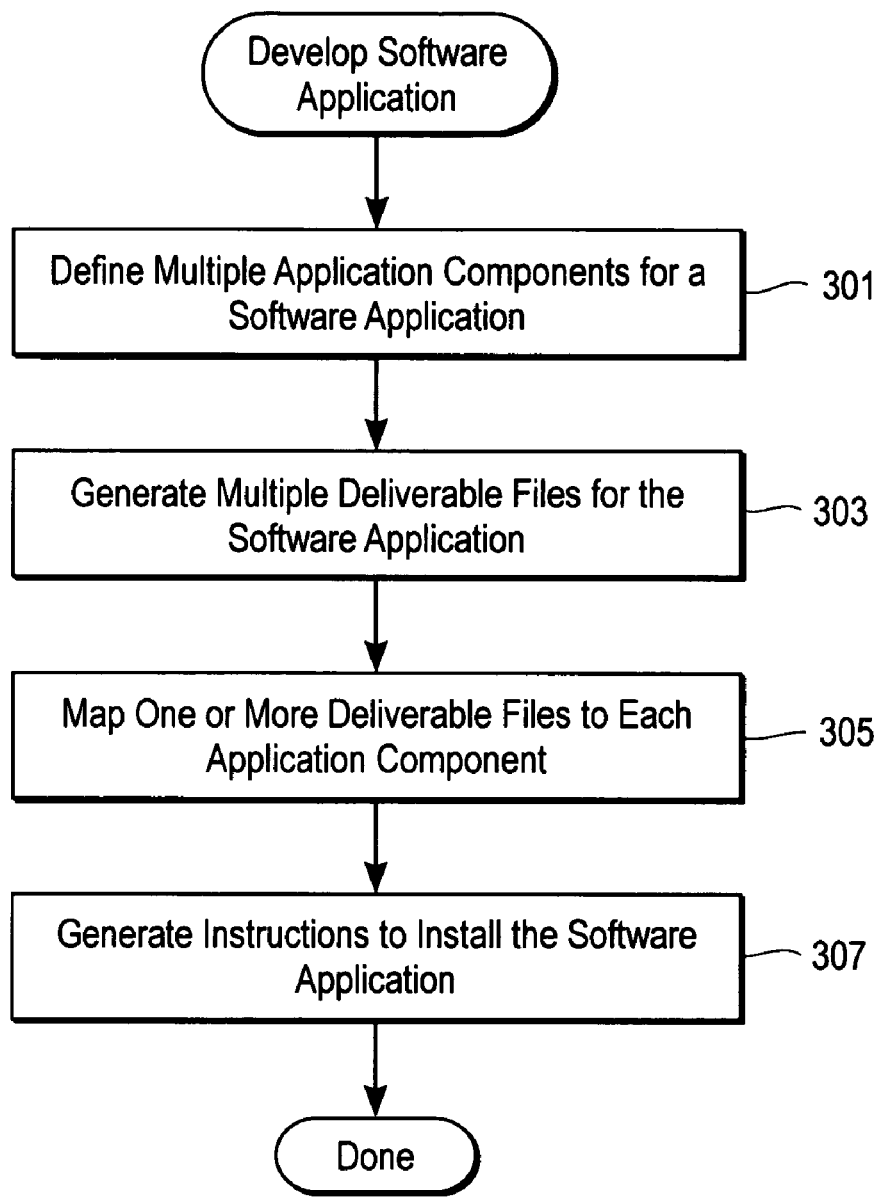
FIG. 4 shows a flowchart of a process of developing a software application.

Now that an embodiment has been described at a high level, it may be beneficial to describe specific details about one embodiment. FIG. 4 shows a flowchart of a process of developing a software application according to one embodiment of the invention. As with all flowcharts shown herein, steps can be added, deleted, reordered, and combined without departing from the spirit and scope of the invention.

At a step 301, multiple application components for a software application are defined. The application components provide high level functionality and are typically implemented using one or more deliverable files. Multiple deliverable files for the software application are generated at a step 303. The deliverable files can be executables, dynamic link libraries, text files, and the like.

At a step 305, one or more deliverable files is mapped to each application component. As mentioned previously, each application component is typically implemented by one or more deliverable files. The mapping of deliverable files to application components can be done in any number of ways. For example, in one embodiment the user is shown a list of deliverable files in a graphical user interface. The user than clicks on a check box in order to indicate or specify that a deliverable file should be mapped to the application component of interest. It should be noted that a deliverable file may be mapped to more than one application component.

At a step 307, instructions to install the software application are generated. The instructions are typically generated using the mapping of deliverable files to the application components. Additionally, the instructions can utilize information that has been gathered during the entire software application development process. As an example, the instructions can be a script for controlling an install program.

Figure 5:
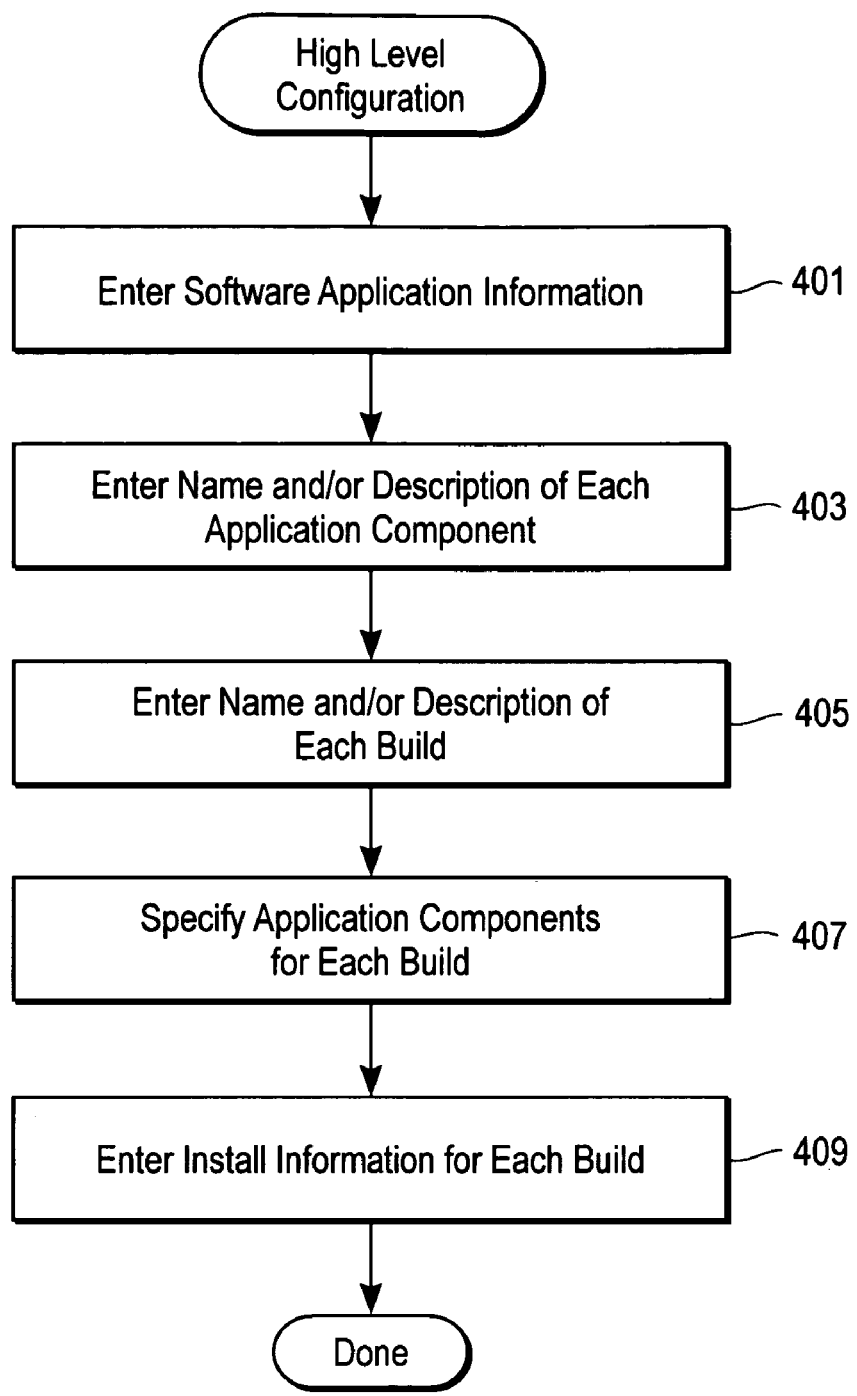
FIG. 5 shows a flowchart of a process of high level configuration for a software application.

In some embodiments, step 301 occurs during the high level configuration and steps 303, 305 and 307 occur during the low level configuration. FIG. 5 shows a flowchart of a process of high level configuration. As mentioned above, the high level configuration can be performed by management at an early stage in the software application development process.

At a step 401, software application information is entered. This information can include the product name, a description of the product, a product logo, and the like. For example, a user can specify the product logo by designating a graphics file (e.g., a gif file) for the logo.

A name and/or description of each application component is entered at a step 403. The application component will provide high level functionality for the software application. As the application components may be defined at an early stage in software application development, in one embodiment a user specifies the name of the application component and a description entailing the functionality (e.g., list of specific functions) that the application component should provide.

Many software applications have multiple builds. A build is a variation of a software application for a specific purpose. For example, a software application can have a server build and a client build. Each build may share many of the same application components and they may also have unique application components. Although multiple builds are not required in every embodiment, some software applications have multiple builds.

At a step 405, a name and/or description of each build is entered. In some embodiments, a user enters the name of the build and then a description of the purpose of the build that makes it different than other builds. Additionally, other information about the lo build can be entered. For example, a user may be asked to specify if the media from which an installation of the build should be performed.

At a step 407, application components for each build are specified. Some application components will be utilized in every build and some application components will only be used in a subset of builds. The application components can be specified or mapped to each build in any number of ways. In one embodiment, the application components are specified utilizing check boxes in a graphical user interface.

Install information for each build can be entered at a step 409. The install information can include the messages that will appear during installation, the end user license agreement, a build specific logo, media from which the build will be performed, and the like. Some of this information can also be entered at step 401 to apply to all builds of the software application. However, step 409 can be utilized to enter build specific install information or to override install information for the software application in general.

Figure 6:
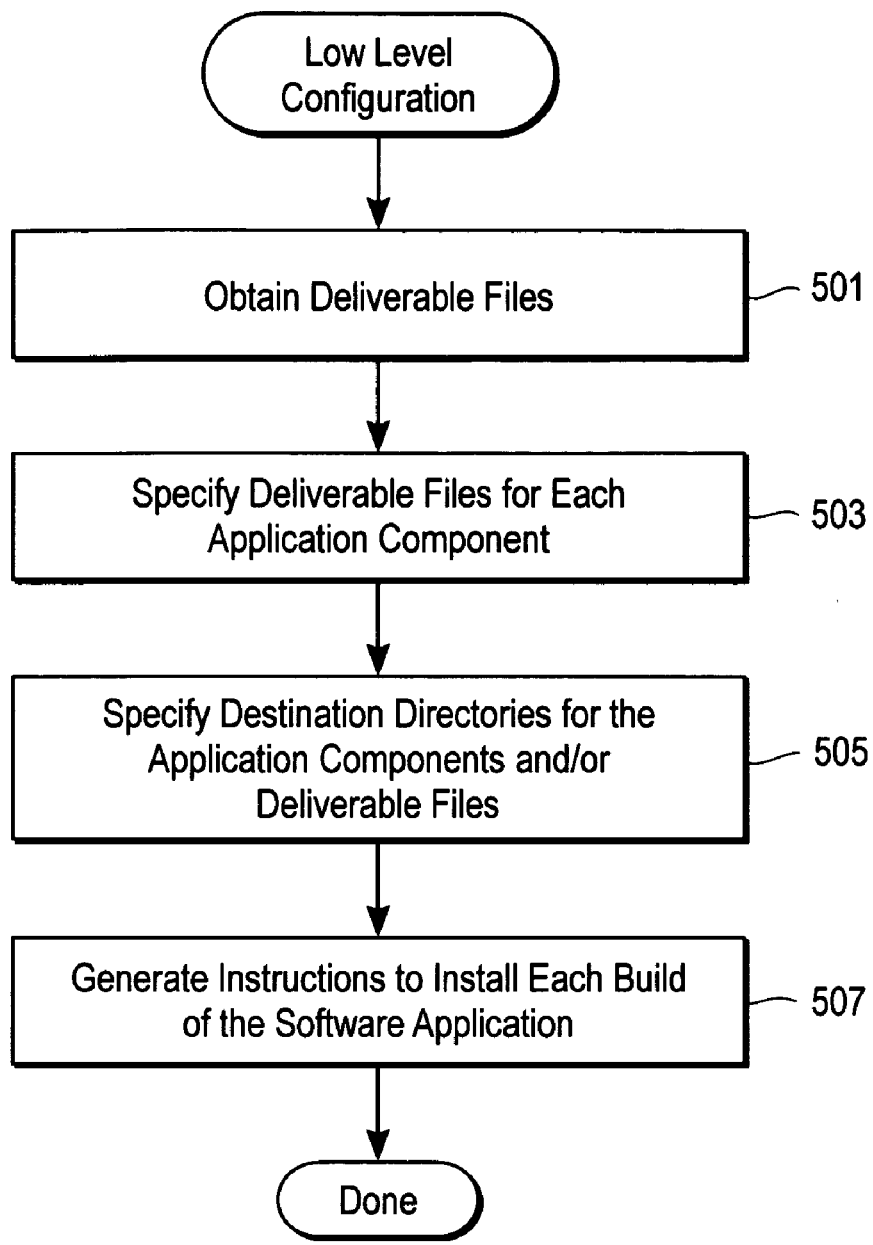
FIG. 6 shows a flowchart of a process of low level configuration for a software application.

During the software application development process, deliverable files for the software application are generated. FIG. 6 shows a flowchart of a process of low level configuration utilizing the deliverable files.

At a step 501, the deliverable files are obtained. For example, the names of the deliverable files can be entered into the system. However, many source code control programs allow a user to extract names of the deliverable files.

Once the deliverable files are obtained, the deliverable files for each application component are specified at a step 503. Each application component typically comprises one ore more deliverable files. A deliverable file can be included in multiple application components or be application component specific. Recall that at step 407 a user specified the application components, so at step 503 the user is presented each application component for a build so that the user can specify the deliverable file or files for each application component. As before, in one embodiment, the user specifies the deliverable files utilizing check boxes in a graphical user interface.

At a step 505, one or more destination directories for the application component and/or deliverable files are specified. In some software applications, the directory structure is best specified utilizing application components. In other software applications, the directory structure is best specified utilizing deliverable files. In one embodiment, a user is given the option of specifying destination directories utilizing application components, deliverable files, or both.

Instructions to install each build of the software application are generated at a step 507. The instructions can be in the form of a program that installs a build, a script for directing an installer program, and the like. As can be seen, information that is gathered throughout the software application development process can be utilized in the installation of a build.

Figure 7:
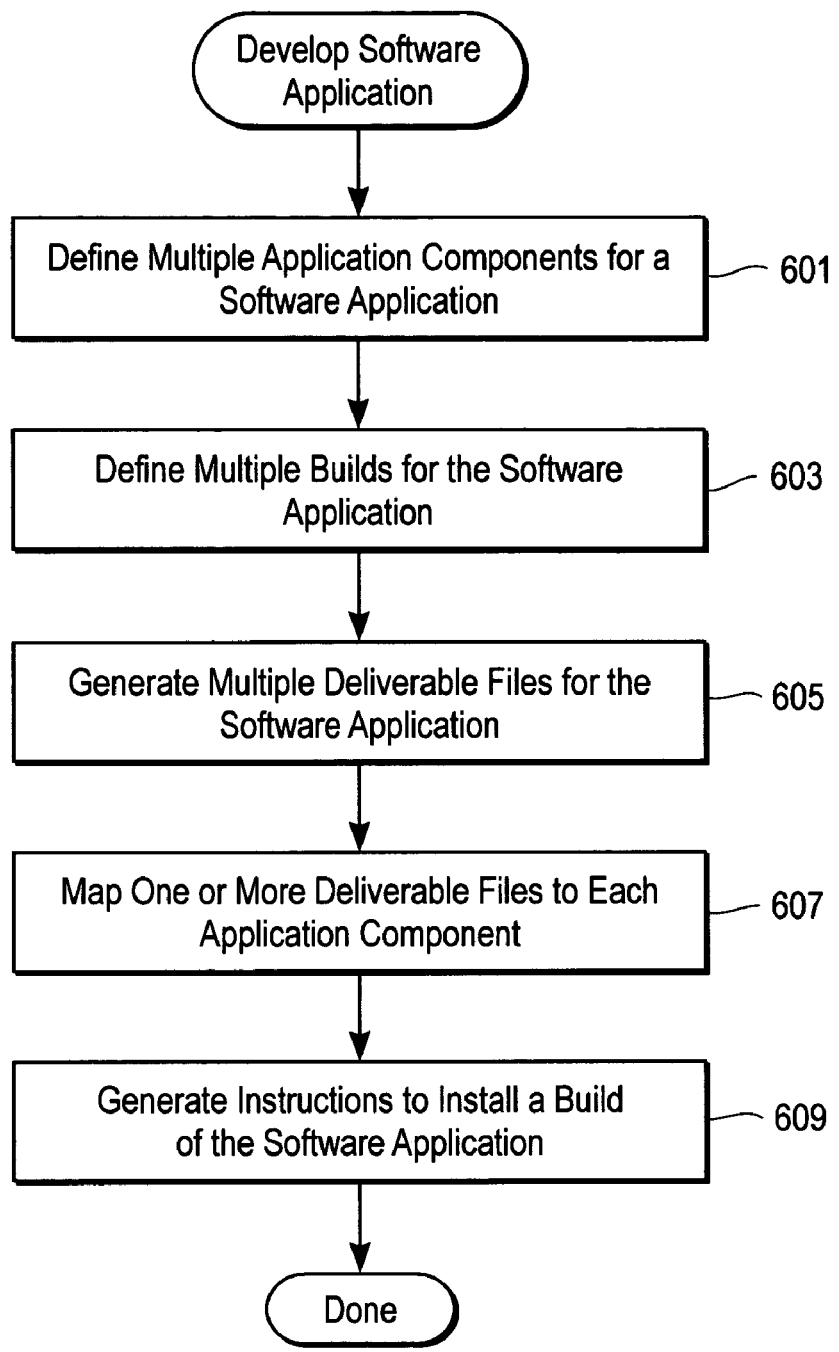
FIG. 7 shows a flowchart of a process of developing a software application that includes multiple builds.

FIG. 7 shows a flowchart of a process of developing a software application that comprises multiple builds. At a step 601, multiple application components for a software application are defined. Multiple builds for the software application are defined at a step 603, where each build comprises one or more application components.

At a step 605, multiple deliverable files for the software application are generated. Typically the deliverable files are generated, but in some embodiments the deliverable files may be obtained from another source.

One or more deliverable files are mapped to each application component at a step 607. After the deliverable files are mapped to application components, instructions to install a build of the software application are generated at a step 609.

With embodiments of the invention, the build and install processes of software application development can utilize information gathered from managers and engineers. This information can be gathered through various stages of development. By incorporating build and install in the development process, software applications can be more efficiently developed.

While the above are complete descriptions of exemplary embodiments of the invention, various alternatives, modifications and equivalence can be used. It should be evident that the invention is equally applicable by making appropriate modifications to the embodiment described above. Therefore, the above description should not be taken as limiting the scope of the invention by the metes and bounds of the following claims along with their full scope of equivalence.

What is claimed is:

1. A method for developing a software application utilizing a software product manager application, comprising:
   defining a first configuration via the software product manager application, the first configuration including a first definition for an application component;
   defining a second configuration via the software product manager application, the second configuration for implementing the first configuration, and the second configuration including a second definition for a deliverable file for the application component;
   providing a graphical user interface for presenting the deliverable file;
   mapping the deliverable file to the application component utilizing the graphical user interface; and
   generating instructions to install the software application utilizing the mapping of the deliverable file to the application component.

2. The method of claim 1, further comprising entering information about the software application into the software product manager application.

3. The method of claim 1, wherein defining the first configuration including the first definition for the application component comprises entering a name for the application component.

4. The method of claim 1, wherein defining the first configuration including the first definition for the application component comprises entering a description for the application component.

5. The method of claim 1, further comprising defining a plurality of builds for the software application, wherein at least one build of the plurality of builds includes the application component.

6. The method of claim 5, wherein defining the plurality of builds for the software application comprises entering a name for each build of the plurality of builds.

7. The method of claim 5, wherein defining the plurality of builds for the software application comprises entering a description for each build of the plurality of builds.

8. The method of claim 5, further comprising mapping the application component to at least one build of the plurality of builds.

9. The method of claim 1, further comprising specifying a directory for the application component.

10. The method of claim 1, further comprising specifying a directory for the deliverable file.

11. The method of claim 1, wherein the instructions to install the software application comprise a script for directing an install program.

12. A computer program product for developing a software application, comprising:
  computer code that receives definitions of a plurality of application components for the software application;
  computer code that obtains a plurality of deliverable files for the software application in accordance with the definitions of the plurality of application components for the software application;
  computer code that provides a graphical user interface for presenting the deliverable file;
  computer code that maps one or more deliverable files to each application component utilizing the graphical user interface;
  computer code that generates instructions to install the software application; and
  a computer readable storage medium that stores the computer codes.

13. The computer program product of claim 12, wherein the computer readable storage medium comprises at least one of a CD-ROM, floppy disk, tape, flash memory, system memory, or a hard drive.

14. A method for developing a software application utilizing a software product manager application, comprising:
  defining a first configuration via the software product manager application, the first configuration including a first definition for an application component;
  defining a plurality of builds for the software application via the software product manager application, at least one build of the plurality of builds including the application component;
  defining a second configuration via the software product manager application, the second configuration for implementing the first configuration, and the second configuration including a second definition for a deliverable file for the application component;
  providing a graphical user interface for presenting the deliverable file;
  mapping the deliverable file to the application component utilizing the graphical user interface; and
  generating instructions to install a build of the software application utilizing the mapping of the deliverable file to the application component.

15. The method of claim 14, further comprising entering information about the software application into the software product manager application.

16. The method of claim 14, wherein defining the first configuration including the first definition for the application components comprises entering a name for the application component.

17. The method of claim 14, wherein defining the first configuration including the first definition for the application components comprises entering a description for the application component.

18. The method of claim 14, wherein defining the plurality of builds for the software application comprises entering a name for each build of the plurality of builds.

19. The method of claim 14, wherein defining the plurality of builds for the software application comprises entering a description for each build of the plurality of builds.

20. The method of claim 14, further comprising mapping one or more the application component to at least one build of the plurality of builds.

21. The method of claim 14, further comprising specifying a directory for the application component.

22. The method of claim 14, further comprising specifying a directory for the deliverable file.

23. The method of claim 14, wherein the instructions to install the software application comprise a script for directing an install program.

24. A computer program product for developing a software application, comprising:
  computer code that receives definitions of a plurality of application components for the software application;
  computer code that receives definitions of a plurality of builds for the software application, each build comprising one or more application components;
  computer code that obtains a plurality of deliverables files for the software application in accordance with the definitions of the plurality of application components for the software application;
  computer code that provides a graphical user interface for presenting the deliverable file;
  computer code that maps one or more deliverable files to each application component utilizing the graphical user interface;
  computer code that generates instructions to install a build of the software application; and
  a computer readable storage medium that stores the computer codes.

25. The computer program product of claim 24, wherein the computer readable storage medium is comprises at least one of a CD-ROM, floppy disk, tape, flash memory, system memory, or a hard drive.

* * * * *